Patented July 19, 1932

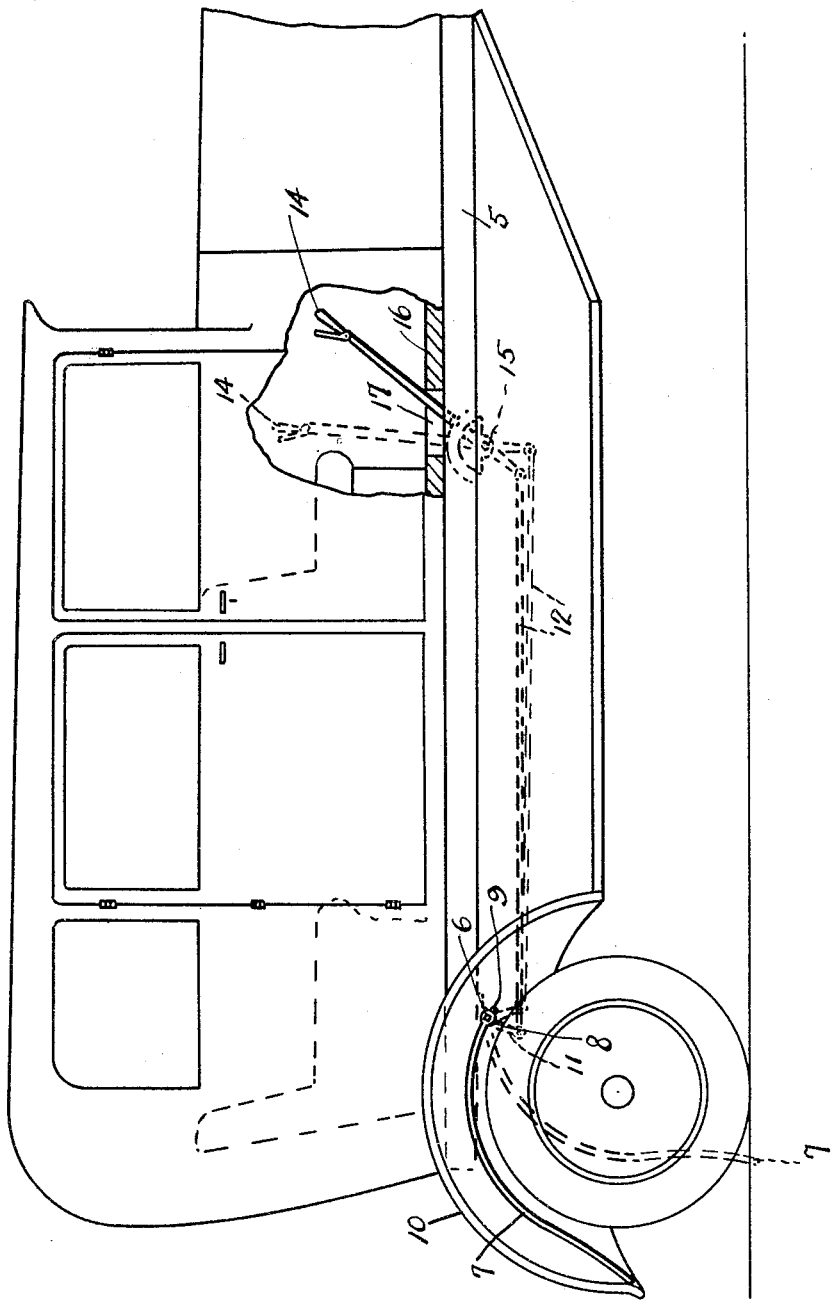

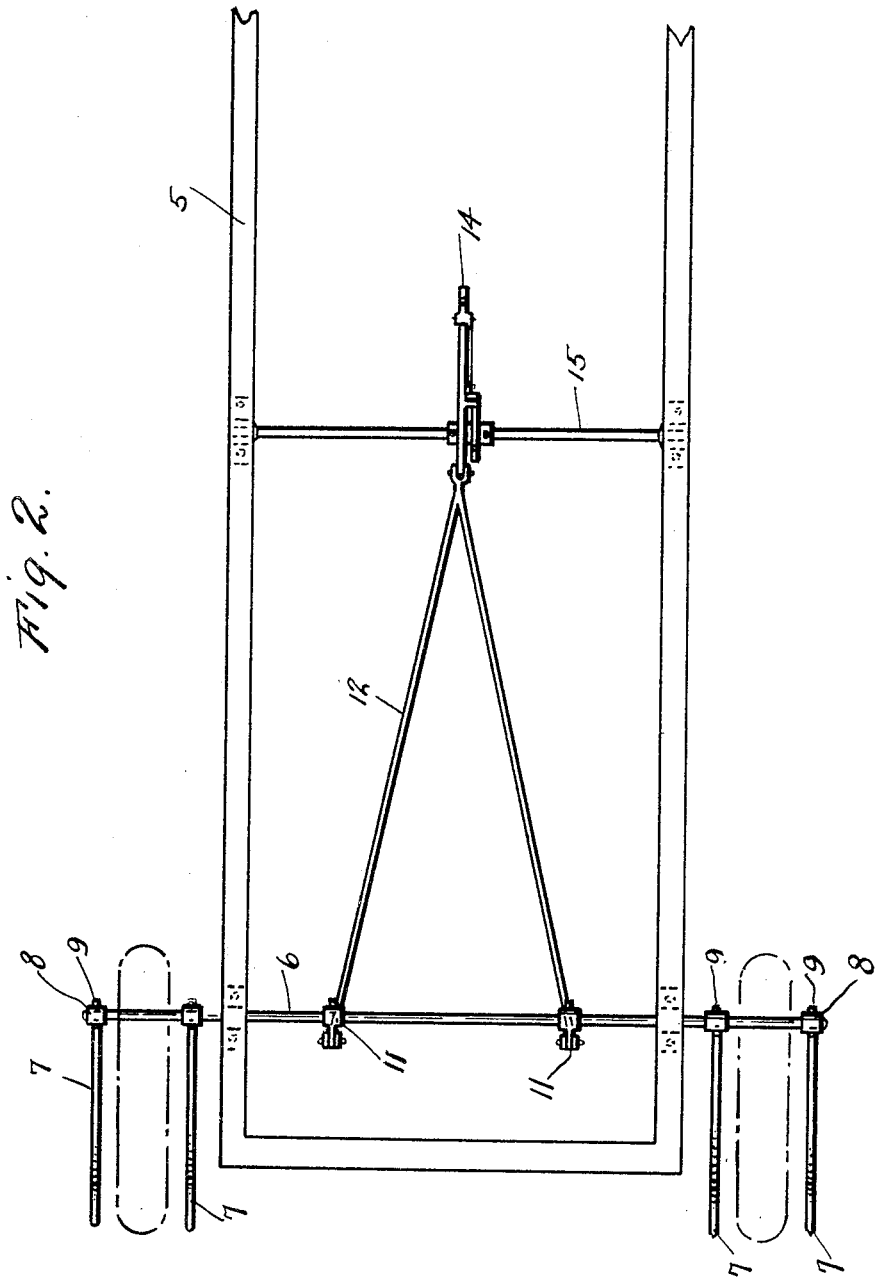

1,868,390

UNITED STATES PATENT OFFICE

VINCENT JENDREJCZAK AND THEODORE KOLACKI, OF AMSTERDAM, NEW YORK

NONSKID APPARATUS FOR AUTOMOBILES

Application filed May 22, 1931. Serial No. 539,368.

This invention relates to an apparatus for preventing the skidding of an automobile and to assist in the braking of the automobile when desired and particularly in emergencies on snow and ice covered streets, roads and the like.

Another important object of the invention resides in the provision of an apparatus of this nature which may be economically incorporated in an automobile, is exceedingly easy and simple to operate, is strong and durable, not likely to easily become out of order, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a fragmentary side elevation of an automobile showing an installation of our apparatus.

Figure 2 is a fragmentary top plan view of an automobile frame showing the installation of our apparatus.

Referring to the drawings in detail it will be seen that the numeral 5 denotes an automobile frame under the rear portion of which is journalled a rocker shaft 6 extending outwardly from the sides of the frame. This shaft 6 is located just forwardly of the rear axle of the automobile. On each end of the shaft 6 to the outside of the frame 5 there is mounted a pair of rods 7, the upper ends of which have collars to receive the shafts and are fixed thereto by means of set screws 9 or other suitable means. The rods 5 are curved as is indicated to advantage in Figure 1 so as to fit conveniently under the rear centers 10 of the automobile. These rods are disposed one to each side of each rear wheel so as to straddle the wheel when disposed in downward operating position as is indicated in dotted lines in Figure 1.

On the shaft 6 within the frame 5 there are mounted a pair of cranks 11 to which are secured the ends of a Y-rod 12. This Y-rod 12 is secured to the lower end of a lever 14 an intermediate portion of which is rockable on a stationary shaft 15 under an intermediate portion of the frame, the lever 14 extending up through the floor board 16 of the automobile which has the opening 17 for this purpose. Obviously by pulling rearwardly on the upper end of the lever 14, the rod 12 is moved forwardly to cause the rocking of the shaft 6 so as to swing the rods 7 down into engagement with the surface on which the wheels of the automobile are riding and these rods will effectively prevent skidding from side to side and will tend to effectively brake the automobile until it comes to a standstill or until the rods are released that is swung upwardly to the out of way position and their respective centers.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described our invention, what we claim as new is:

1. In combination an automobile including a frame, rear wheels, and rear fenders, a shaft rockable across the rear portion of the frame forwardly of the center of the wheels, a pair of rods on each end of the shaft at the outside of the frame, one to each side of the adjacent wheel, and means for rocking the shaft to cause the rods to be located up under the fender or to be swung downwardly into engagement with the ground.

2. In combination an automobile including a frame, rear wheels, and rear fenders, a shaft rockable across the rear portion of the frame forwardly of the center of the wheels, a pair of rods on each end of the shaft at the outside of the frame, one to each side of the adjacent wheel, and means for rocking the shaft to cause the rods to be located up under the fender or to be swung downwardly into engagement with the ground, said rods being curved.

3. In combination an automobile including a frame, rear wheels, and rear fenders, a shaft rockable across the rear portion of the frame forwardly of the center of the wheels, a pair of rods on each end of the shaft at the outside of the frame, one to each side of the adjacent wheel, and means for rocking the shaft to cause the rods to be located up under the fender or to be swung downwardly into engagement with the ground, said rods being curved, said means for rocking the shaft comprising cranks projecting from intermediate portions of the shaft, a rod engaged with said crank, a lever, means for mounting the lever in the automobile, intermediate the ends of the lever, said rod being engaged with the bottom end of the lever.

In testimony whereof we affix our signatures.

VINCENT JENDREJCZAK.
THEODORE KOLACKI.